United States Patent [19]
Whitmire

[11] Patent Number: 5,240,188
[45] Date of Patent: Aug. 31, 1993

[54] UNIVERSAL MULCHING MACHINE AND METHOD

[76] Inventor: Clifton E. Whitmire, 830 Cherry Hill, Wheeling, W. Va. 26003

[21] Appl. No.: 835,527

[22] Filed: Feb. 14, 1992

[51] Int. Cl.$^5$ .................... B02C 13/04; B02C 23/02
[52] U.S. Cl. .................... 241/29; 241/56; 241/101.7; 241/152.2; 241/101.2
[58] Field of Search ............ 241/56, 188.1, 193, 241/101.7, 152.2, 29, 101.2

[56] References Cited

U.S. PATENT DOCUMENTS

| | | | |
|---|---|---|---|
| 1,561,093 | 11/1925 | McCargar | 241/152.2 |
| 1,724,072 | 8/1929 | Daniels | 241/56 |
| 2,105,803 | 1/1938 | Barnes | 55/118 |
| 3,392,923 | 7/1968 | Reinecker et al. | 241/56 |
| 3,716,198 | 2/1973 | Lautzenheiser | 241/188.1 |
| 3,817,462 | 6/1974 | Hamlin | 241/101.7 |
| 4,875,630 | 10/1989 | Carlson | 241/56 |
| 4,951,882 | 8/1990 | Ober | 241/55 |
| 5,018,672 | 5/1991 | Peck et al. | 241/37.5 |
| 5,020,309 | 6/1991 | Hopkins | 56/13.3 |
| 5,085,376 | 2/1992 | Litchenburg | 241/56 |

*Primary Examiner*—Mark Rosenbaum
*Assistant Examiner*—John M. Husar
*Attorney, Agent, or Firm*—Douglas G. Glantz

[57] ABSTRACT

The present invention includes mulching apparatus and method for comminuting solid organic vegetation material including a housing having an inlet opening and an outlet opening, a power-driven, rotatable shaft mounted in said housing, a fan blade assembly driven by said shaft for propelling said solid material between said inlet opening and said outlet opening, a flinger assembly of flexible flinger bars rotatably driven by said shaft, each flinger bar comprising a substantially rigid bar member movably affixed pivotally on said flinger assembly and having a substantial inertial mass sufficient for reducing clogging. In one aspect, protective channel means are adapted to reduce clogging of said solid material and form a protective channel for flinger movement through said channel whereby said movably affixed flinger bar member is disposed to stand out radially from said rotatably driven flinger assembly while flexibly traversing through the channel. In one aspect, the present invention includes mulching apparatus and method having a first stage cutter assembly followed by said flinger assembly as a second stage. In one aspect, the present invention includes mulching apparatus and method for comminuting solid landscaping material positioned on a wheeled frame with hitch receiver for attachment to a drive vehicle.

19 Claims, 6 Drawing Sheets

UNIVERSAL MULCHING MACHINE AND METHOD

BACKGROUND OF THE INVENTION

1. Field of the Invention

This invention relates to apparatus and method for disposing of organic vegetation materials. In one aspect, the invention relates to comminuting organic vegetation materials, such as that encountered in landscaping activities, to produce a mulch.

2. Background Information

Barnes, U. S. Pat. No. 2,105,803, discloses a lawn cleaning machine having suction means to gather leaves, grass clippings, and the like from the ground, convey the same through a cutting mechanism, and distribute the shredded material. The invention is mobile on a wheeled frame. A suction fan 16 is disposed within a housing adjacent the inlet opening. Rotating and stationary cutting disks 27 and 28 are mounted on the free end of the motor shaft.

Reinecker et al, U. S. Pat. No. 3,392,923, disclose a mulching machine with flail and blower adapted to be mounted on the back of a truck 10 or any moving platform (Col. 2, lines 11-15). FIG. 4 shows fan 61 and flails 62 attached to the same rotating shaft.

Carlson, U.S. Pat. No. 4,875,630, shows a leaf vacuum and shredder which can be mounted on a trailer for pulling behind a vehicle (Col. 3, lines 62-64). Fan 60 creates a vacuum to suck up the leaves. The leaves first are drawn from the inlet hose into a shredding chamber and then pass to the vacuum chamber housing the fan. The shredding chamber employs whips or thin blades 50 of stiff metal wire so that valuable shell crops such as nuts are not shredded or comminuted by the machine. These nuts, which are mixed with the leaves and vegetation matter on the ground, are sucked up into the shredding chamber but do not suffer significant damage in the Carlson machine because the loose whips give rather than impact with force. (Carlson at Col. 2, lines 31-38.)

Because of costs involved today in collecting and disposing of organic vegetation matter, a machine presently is needed to collect such vegetation matter, further to collect vegetation matter over a broad range of vegetation size and consistency, to reduce the volume of such collected vegetation matter for disposal and/or to reduce the size of such matter for recycled use as mulch, and further to collect and reduce such vegetation matter in substantial volumes without clogging.

It is an object of the present invention to provide efficient means and method for collecting and disposing of organic vegetation material.

It is a further object of the present invention to provide efficient means and method for gathering leaves and landscaping vegetation materials.

It is yet another object of the present invention to provide efficient means and method for gathering leaves and landscaping vegetation materials, including such leaves or vegetation materials when gathered in voluminous piles produced by a large estate, a golf course, or the like.

It is another object of the present invention to provide efficient means and method for gathering leaves and landscaping vegetation materials, including when such leaves or vegetation materials are wet or have a tendency to agglomerate.

It is another object of the present invention to provide efficient means and method for gathering leaves and landscaping vegetation materials, including for a broad range of sizes of such vegetation materials.

It is yet another object of the present invention to provide efficient means and method for gathering leaves and landscaping vegetation materials, including for a broad range of different toughness of material consistency of such vegetation materials.

It is a further object of the present invention to provide efficient means and method for gathering leaves and landscaping vegetation materials and for disposing of such leaves and vegetation materials through recycling for further use as valuable landscaping mulch.

These and other objects of the present invention will become apparent from the detailed description which follows.

SUMMARY OF THE INVENTION

The present invention includes mulching apparatus and method for comminuting solid organic vegetation material including a housing having an inlet opening and an outlet opening, a power-driven, rotatable shaft mounted in said housing, a fan blade assembly driven by said shaft for propelling said solid material between said inlet opening and said outlet opening, a flinger assembly of flexible flinger bars rotatably driven by said shaft, each flinger bar comprising a substantially rigid bar member movably affixed pivotally on said flinger assembly and having a substantial inertial mass sufficient for reducing clogging. In one aspect, protective channel means are adapted to reduce clogging of said solid material and form a protective channel for flinger movement through said channel whereby said movably affixed flinger bar member is disposed to stand out radially from said rotatably driven flinger assembly while flexibly traversing through the channel. In one aspect, the present invention includes mulching apparatus and method having a first stage cutter assembly followed by said flinger assembly as a second stage. In one aspect, the present invention includes mulching apparatus and method for comminuting solid landscaping material positioned on a wheeled frame with hitch receiver for attachment to a drive vehicle.

DETAILED DESCRIPTION

Figure 1:
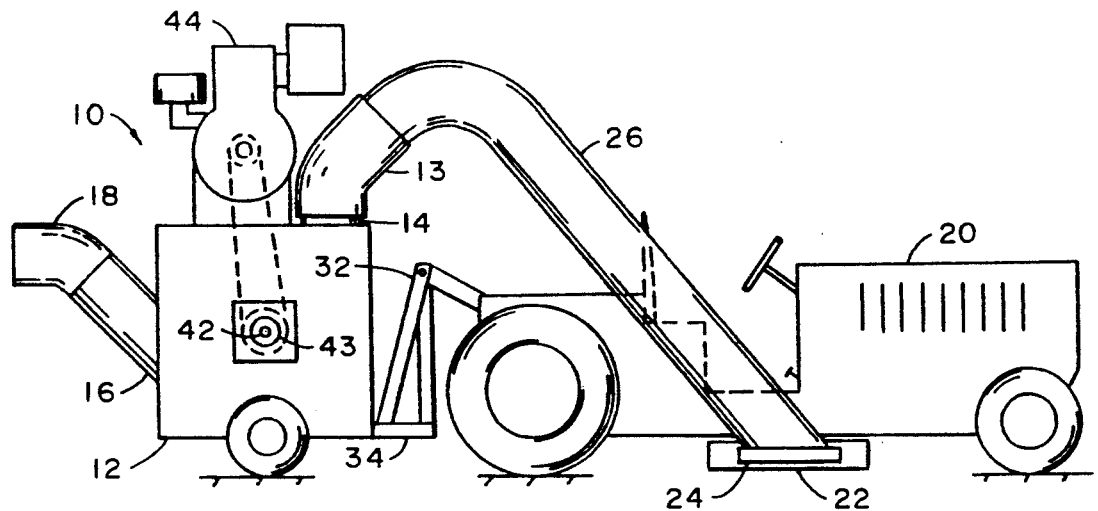
FIG. 1 depicts a side view of the universal mulching machine of the present invention positioned on a wheeled frame and attached to a tractor with mower deck.

Referring now to FIG. 1, universal mulching machine 10 is positioned on wheeled frame housing 12 and attached to lawn or garden tractor 20. Mower deck 22 attached to tractor 20 has clippings discharge 24. Chute 26 connects to discharge 24. Chute 26 is formed to provide a conduit for clippings, or other materials such as leaves, from mower deck discharge 24 to connector 13 and to housing inlet 14 of universal mulching machine 10. Chute 26 having a tubular inside diameter, by way of example in one embodiment of preferably about six (6) inches, is constructed of substantially rigid plastic tube. Alternatively, a flexible hose (not shown), e.g. of six (6) inches diameter, can be attached to connector 13 and to inlet 14 and used to collect leaves from around shrubs, gutters, or other obstacles which make it difficult or impossible to collect with a mower deck attached to a tractor.

Organic vegetation matter fed to mulching machine 10 through housing inlet 14 is shredded or comminuted in machine 10 and passed to housing outlet 16. Conduit 18 attached to housing outlet 16 is designed and constructed further to direct the passage of shredded vegetation matter.

Mulching machine 10 on wheeled frame 12 is attached to tractor 20 by means of three point hitch 32 with hitch connector assembly 34.

Figure 2:
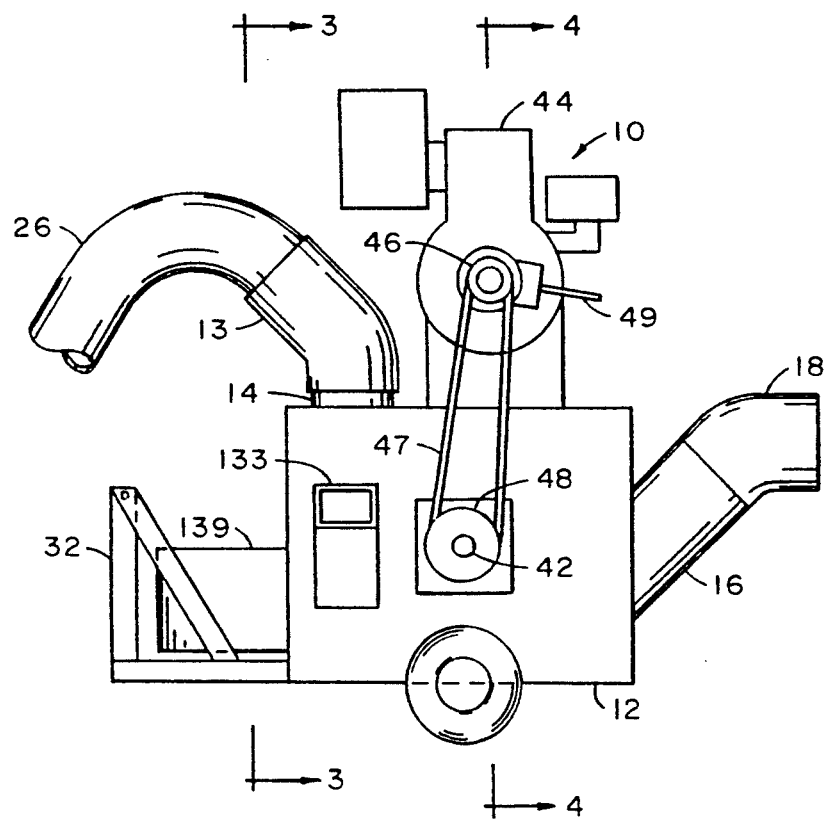
FIG. 2 shows the opposite (as to FIG. 1) side view of the universal mulching machine of the present invention.

FIG. 2 shows the opposite (as to FIG. 1) side view of the universal mulching machine of the present invention. Chute 26 carries clippings or leaves, e.g., such as from the mower deck discharge, to connector 13 and to housing inlet 14 of universal mulching machine 10. Organic vegetation supplied to mulching machine 10 through housing inlet 14 is shredded in machine 10 and passed to housing outlet 16. Power for shredding within the confines of mulching machine 10 is provided by central shaft 42. Shaft 42 can be any shaft sufficient to provide proper power and torque to shredding apparatus further described in detail hereinbelow. In one embodiment by way of example, shaft 42 can be a one-inch diameter steel shaft. Engine 44, preferably of gasoline internal combustion but generally of any type preferably having portability, drives shaft 42 through drive belt 47 through drive pulley 46 and pulley wheel 48. By way of example, a sixteen (16) horsepower gasoline engine 44 drives a forty-two (42) inch V-belt through a five-eighths ($\frac{5}{8}$) inch belt drive pulley 46 and three (3) inch diameter pulley wheel 48. Drive belts, wheels, and pulleys should be covered by protective safety shrouds (not shown). A centrifugal clutch mechanism controlled at clutch lever 49 operates to delay the starting of the internal shredding mechanism (hereinafter described) until after the engine gets up to operating speed. An overload mechanism (not shown) on the clutch reduces problems arising from jamming.

Figure 3:
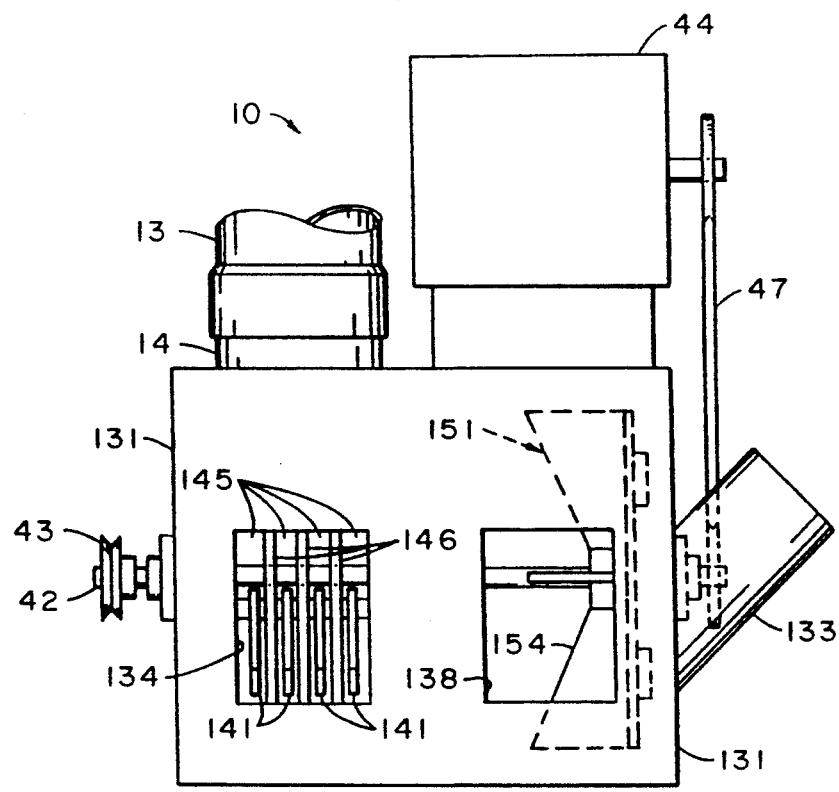
FIG. 3 shows a section taken on line 3—3 of FIG. 2 without the dome conduit.
Figure 4:
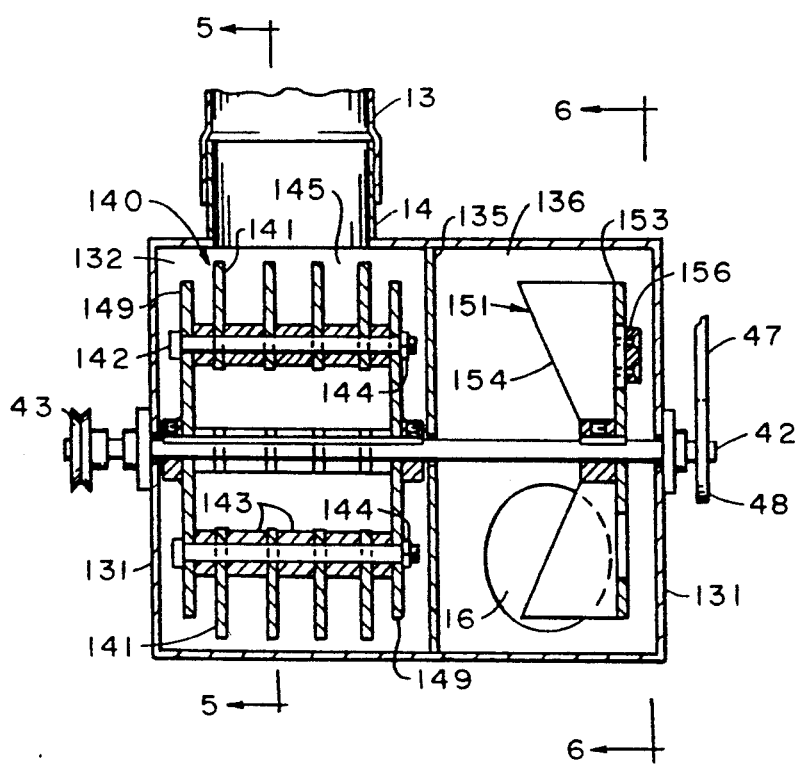
FIG. 4 shows a section taken on line 4—4 of FIG. 2 of a flinger assembly and in assembly in accordance with the present invention.

FIG. 3 shows a front (the side facing the tractor as shown in FIG. 1) view of the universal mulching machine of the present invention. FIG. 4 shows a section taken on line 4—4 of FIG. 2 of a flinger assembly and fan assembly in accordance with the present invention. Organic vegetation materials are fed through inlet 14 to chamber 132 formed on the left side (as viewed in FIG. 4) of machine 10 by walls formed by housing walls 13i and central divider wall or partition 135. Vegetation matter fed through inlet 14 and passing into chamber 132 comes into contact with flingers 141. Vegetation matter exits left chamber 132 though passageway 134 (as shown in FIG. 3) and passes to chamber 136 through passageway 138. A dome-like conduit 139 (shown in FIGS. 2, 5, and 6) covers and provides conduit for material passage from passageway 134 and to passageway 138. Chamber 136 is formed on the right side of machine 10 (as shown in FIG. 4 as viewed from the tractor-side of machine 10) by walls formed by housing walls 131 and central divider wall 135. Vegetation matter fed through passageway 138 is pulled to and moved through chamber 136 by fan assembly 151 and exits through the outlet of machine 10 in the rear as outlet 16.

Inlet 133 (FIG. 3) is constructed and located in the sidewall housing of machine 10 as a window to chamber 136 to permit tree limbs, brush, or other such organic vegetation matter in elongated shape such as tree limbs to be fed to chamber 136 and to come into contact with cutter 156 formed by raised cutter edge in fan blade 154. The universal mulching machine of the present invention through inlet 133 and cutter 156 provides what is commonly called a chipper/shredder/mulcher.

Apparatus comprising a power take-off 43 provides drive power for miscellaneous attachments (not shown) using power from the engine of the machine and transmitted through the centrifugal clutch.

Figure 5:
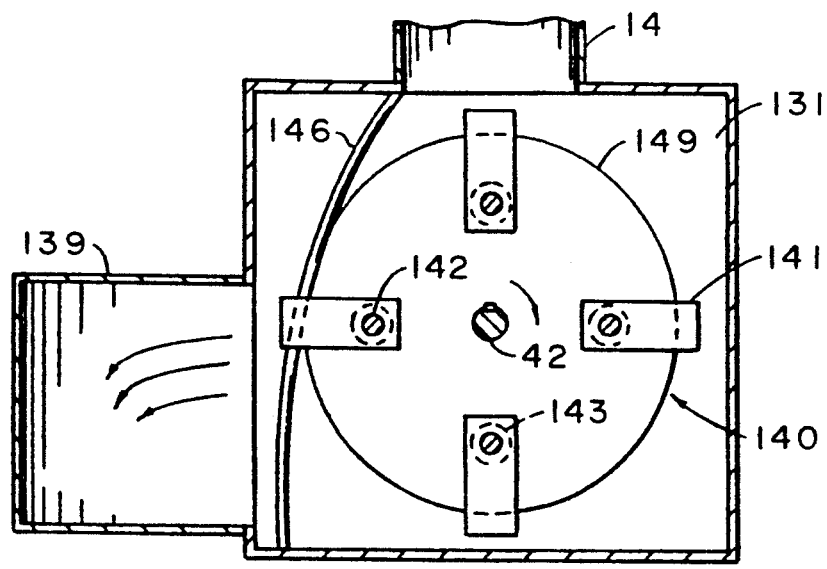
FIG. 5 taken on line 5—5 of FIG. 4 of the flinger ass in accordance with the present invention.

A plurality of flingers 141 are assembled in flinger assembly 140 as shown in one embodiment in FIG. 4 and FIG. 5. Flingers 141 are rotatably or pivotally connected to flinger shafts 142. For example, flingers 141 are bored through one end, and then shaft 142 is placed through the bores of flinger bars 141. Spacers 143 are interposed between each flinger 141 to constrain lateral movement on shaft 142. In the embodiment shown in FIG. 4 and FIG. 5, flinger assembly 140 provides four (4) flingers 141 on each flinger shaft 142 for a total of sixteen (16) flingers 141 formed of rigid bars of one-quarter inch thick steel having width and length dimensions of about one inch and about three inches, respectively. In one embodiment, flingers 141 can be positioned with interposing spacers 143 provided by one-inch sleeves or bushings positioned on flinger shaft 142. Flinger shafts 142 are affixed to end-plates 149 by nuts 144, or similar mechanical fasteners, as provided by one-half ($\frac{1}{2}$) inch hardened nuts in FIG. 4 of the presently described embodiment of the invention.

The universal mulching machine of the present invention operates to comminute solid organic vegetation material through flinger assembly 140 through contact with rotatable flinger bars 141 rotatably driven by central shaft 42, each flinger bar comprising a substantially rigid bar member 141 movably affixed pivotally on said flinger shaft 142 and having a substantial inertial mass sufficient for shredding, moving vegetation matter through chamber 132, and preventing clogging.

As shown in one embodiment in the configuration shown in FIG. 3 and FIG. 5, protective channels 145 are formed by channel rods 146. A protective channel 145 is formed for each flinger 141. When the flinger assembly of the present invention is started up into rotating operation, the individual flingers 141 stand out into the protective channels 145. When power is stopped, flingers 141 stand down.

The protective rods 146 in forming protective channels 145 thereby act to cooperate with the movably affixed flinger bar member designed and constructed to stand out radially from said rotatably driven flinger assembly while flexibly traversing through the channel. When protective rods 146 form the protective channel 145 for flinger movement through the channel, the universal mulching machine of the present invention operates to be self-cleaning of leaves or landscaping refuse matter which otherwise would clog the machine.

It has been found that the protective rods 146 further cooperate with flingers 141 to increase shredding efficiency. It is believed that the protective rods 146 operate to slow passage of vegetation matter through chamber 132 (shown in FIG. 4) and further operate to position such vegetation matter for more complete shredding or comminuting by flingers 141. Without protective rods 146, fan 151 would pull materials through the chamber 132 too fast and without proper positioning, and incomplete comminution is the result.

Figure 6:
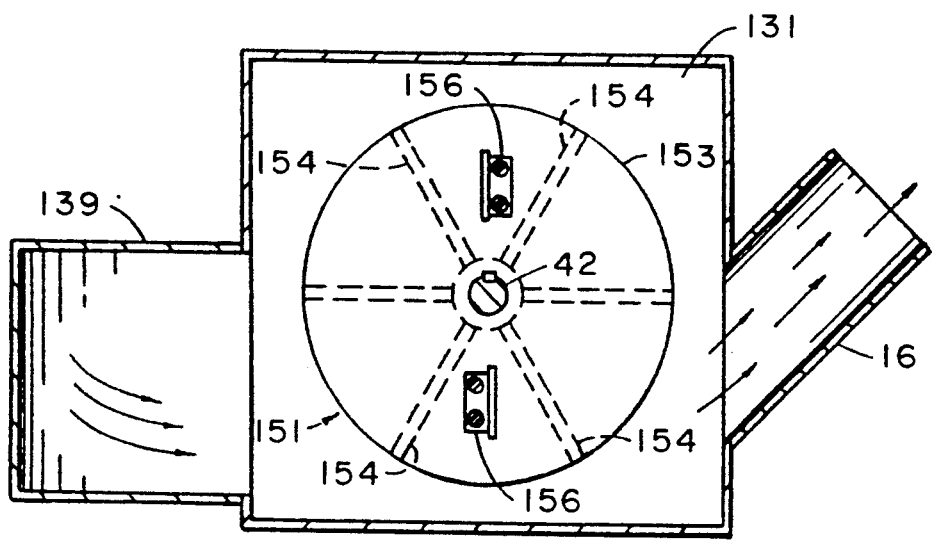
FIG. 6 shows a section taken on line 6—6 of FIG. 4 showing side vie fan assembly in accordance with the present invention.

FIGS. 3, 4, and 6 show fan assembly 151 having blades 154 and fly wheel 153. The fan blade assembly further includes a shroud (not shown) positioned near the fan blades with a radius of curvature slightly larger than a radius extending out to the fan blade periphery. In one embodiment, fan 151 is twelve (12) inches in diameter. Raised cutters 156 are constructed on fly wheel 153 of the embodiment of the present invention shown in FIGS. 3, 4, and 6. A channel or cut-out (not shown) provided adjacent to each cutter 156 passes chips and shredded material to fan chamber 136. Fly wheel 153 on fan assembly 151 provides stability to the fan, including when cutters 156 are employed in a chipper operation in cooperation with inlet window 133.

Figure 7:
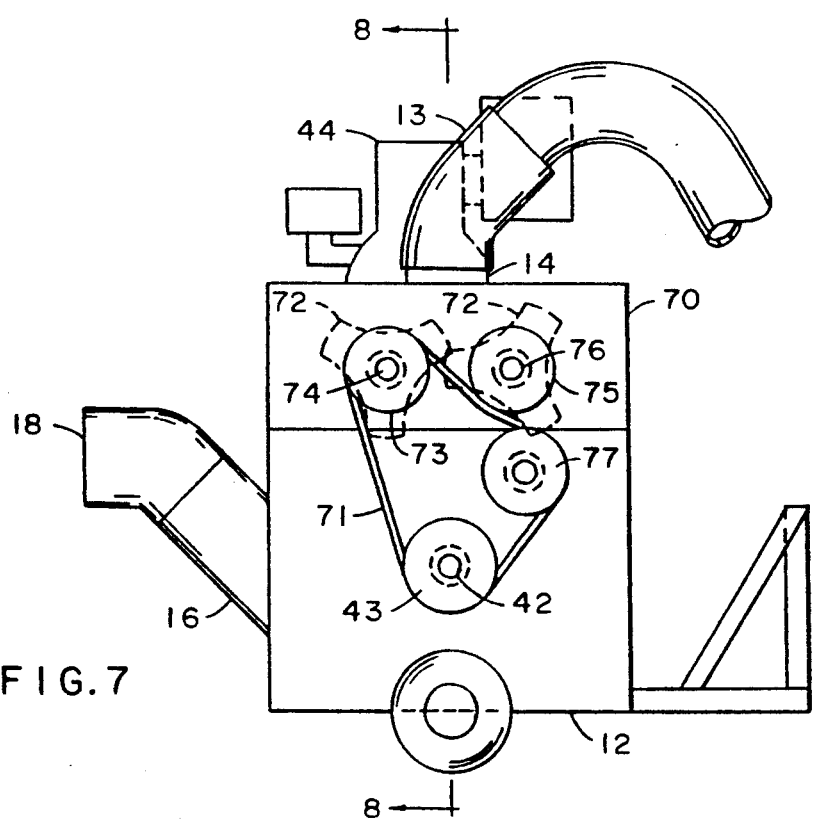
FIG. 7 shows a side view as in FIG. I and with a first stage cutter knives assembly.

In one aspect, the present invention includes mulching apparatus and method having a first stage cutting knife assembly followed by the flinger assembly as a second stage. Referring to FIG. 7, cutting knife assembly 70 includes a series of cutter knives 72 positioned on shafts 74 and 76. Drive belt 71 driven by power take-off 43 drives pulleys 73 and 75 connected to shafts 74 and 76, respectively. Drive belt 71 passes over pulleys 73 and 75 in clockwise rotation (as viewed in the perspective provided in FIG. 7) and subsequently passes over idler pulley 77 before contacting power take-off 43 attached to drive shaft 42.

Figure 8:
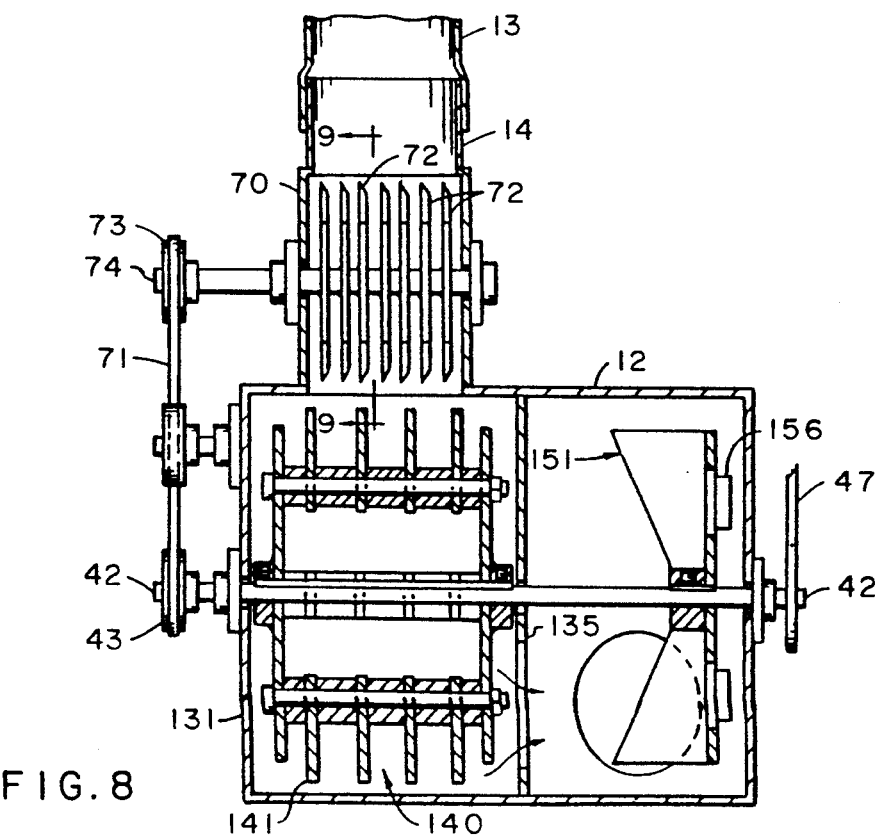
FIG. 8 shows a section taken on line 8—8 of FIG. 7.

FIG. 8 presents a cutaway view of the first stage cutter knives assembly 70 as it is positioned over second stage flinger assembly 140. Organic vegetation materials are fed through inlet 14 to first stage cutter knives assembly 70 prior to passing through to flinger assembly 140 located below in the left chamber of housing 12 formed by housing walls 131 and central divider wall or partition 135. Vegetation matter fed through inlet 14 and passing through cutter assembly 70 is cut by cutters 72 prior to coming into contact with flingers 141. Vegetation matter exits from the flinger assembly though the passageway in the lower portion of divider wall 135 as shown by arrows in FIG. 8. The passageway provides an internal conduit for transferring material from the flinger assembly to the fan chamber as an alternate, and in lieu of conduit 139 shown in different embodiment in FIGS. 2 and 3. Vegetation matter fed through passageway in divider 135 is pulled to and moved through by fan 151.

It has been found that the external dome-like conduit 139 provides for better comminuting in the apparatus and method of the present invention including a flinger assembly without a first stage cutter assembly. It is believed that such observation of better comminuting can be explained by a process of slowing down the transfer of material through the conduit. However, an internal conduit as shown in FIG. 8 has been found to provide higher resistance to clogging, which becomes highly beneficial in the apparatus and method of the present invention incorporating a first stage cutter assembly in combination with a second stage flinger assembly.

It has been found that the mulching apparatus and method of the present invention in one embodiment providing a first stage cutter knives assembly and a second stage flinger assembly operates with superior results on certain vegetation matter having a toughness of material consistency. Leaves such as oak leaves preferably are processed through a mulching machine of the present invention comprising a first stage cutter knives assembly provided by cutters 72 prior to shredding by a second stage flinger assembly having flingers 141.

Figure 9:
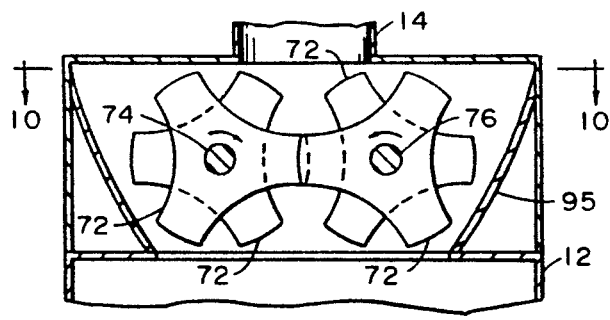
FIG. 9 shows a section through the first stage cutter knives assembly on line 9—9 of FIG. 8.

FIG. 9 shows a sectional view through the first stage cutter knives assembly taken on line 9—9 of FIG. 8. Cutter knives 72 are positioned on shafts 74 and 76 which counter-rotate as indicted by the arrows shown in FIG. 9. A shroud 95 directs material into the cutter knives. Cutter knives can be provided by three-blade discs, as shown, but other configurations are effective to provide the cutting function. Cutters 72 can be blades of two inches length on shafts 74 and 76 of ¾ inch pipe axle.

Figure 10:
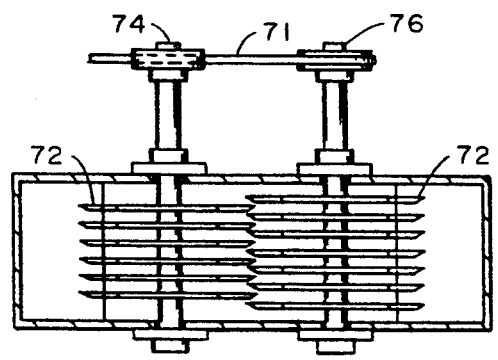
FIG. 10 shows a top sectional view of the first stage cutter knives assembly taken on line 10—10 of FIG. 9.

FIG. 10 shows a top sectional view of the first stage cutter knives assembly taken on line 10—10 of FIG. 9. Seven (7) cutters 72 of three-blade discs are depicted on shaft 76, and six (6) cutters 72 are shown on shaft 74. Other configurations can be employed to provide the first stage cutter knives of the present invention. One alternate embodiment includes six (6) cutters each on shaft 74 and shaft 76, and many other configurations can operate effectively in the first stage cutter knives of the present invention.

Figure 9A:
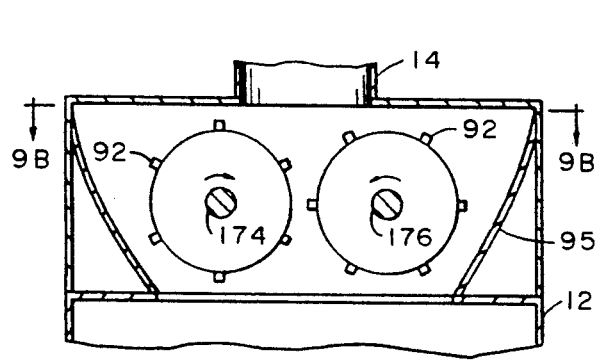
FIG. 9A shows an elevation sectional view of an alternate first stage cutter wheel.

FIG. 9A shows an elevation sectional view of an alternate first stage cutter assembly wheel. Cutter bars 92 are positioned on shafts 174 and 176 which counter-rotate as indicted by the arrows shown in FIG. 9A. A cutter shroud 95 directs material into the cutter bars.

Figure 9B:
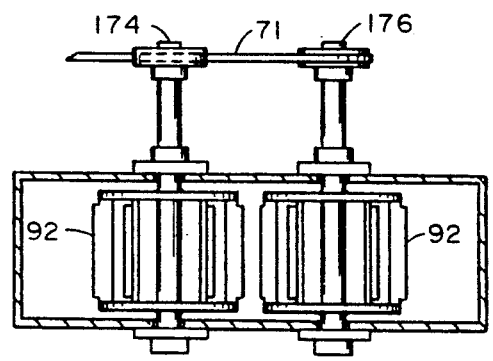
FIG. 9B shows a top sectional view of the alternate cutter bar wheel taken on line 9B—9B of FIG. 9A.

FIG. 9B shows a top sectional view of the alternate cutter bar wheel taken on line 9B—9B of FIG. 9A. Cutter bars 92 can be provided by bars or blades similar in configuration to the blades on a reel-type grass cutter.

Figure 11:
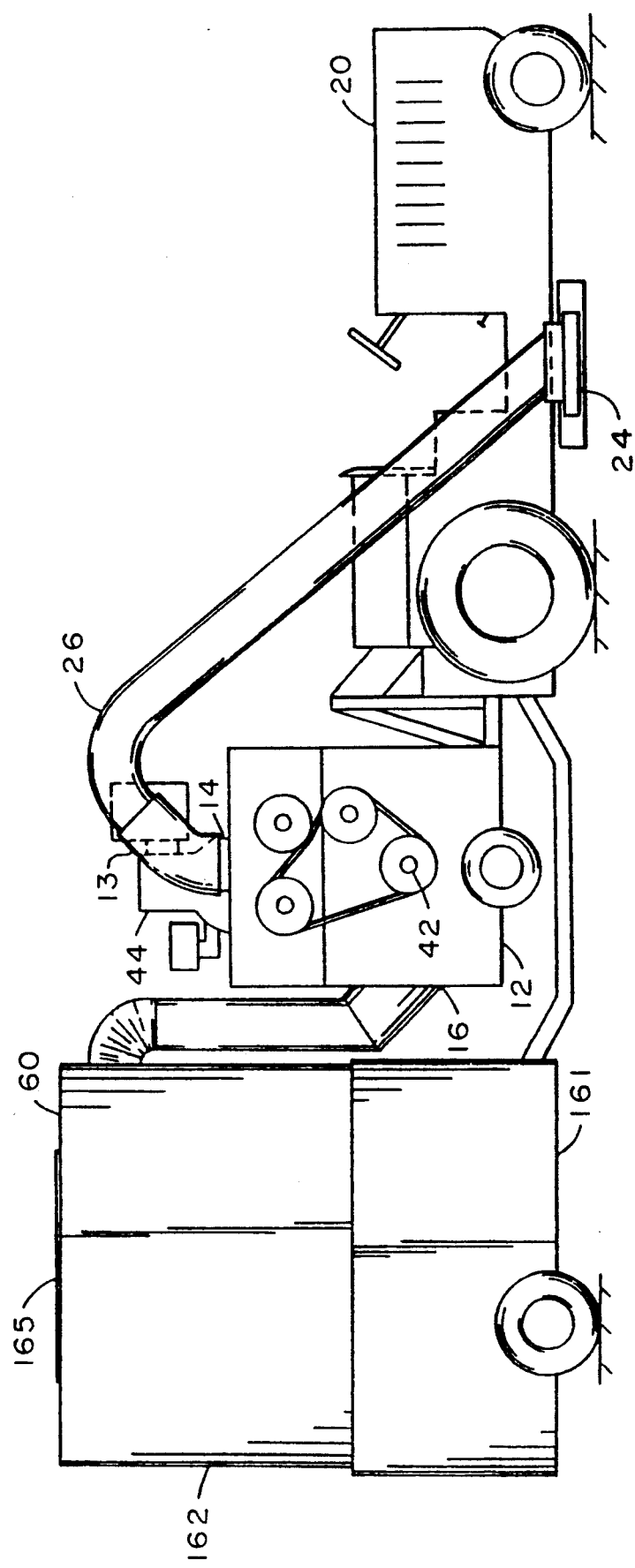
FIG. 11 depicts a side view of the universal mulching machine of the present invention positioned on a wheeled frame, attached to a tractor with mower deck as in FIG. 1, and further connected to a covered wheeled mulch collector.

FIG. 11 depicts a side view of the universal mulching machine 10 of the present invention positioned on a wheeled frame, attached to a tractor 20 with mower deck, and further connected to a covered wheeled mulch collector 60. Shredded vegetation materials and mulch exiting from mulching machine 10 through outlet 16 are passed to wagon collector 161 having cover 162. Screen 165 in cover 162 provides for positive ventilation to facilitate flow of shredded material into wagon collector 161.

Referring to FIGS. 1, 2, and 11, conduit fitting 13 for making the connection between chute 26 and machine inlet 14 is designed and constructed to be at a forty-five (45) degree angle as shown in the embodiments of the present invention depicted in FIGS. 1, 2, and 11. It has been found that an angle of ninety (90) degrees for conduit fitting 13 provides only marginal performance. Preferably, the mulching machine of the present invention comprises a conduit fitting having a configuration forming an angle between the discharge chute 26 and the machine inlet 14 of less than about sixty (60) degrees and, more preferably, less than or equal to about forty-five (45) degrees.

The mulching machine of the present invention having flingers and protective channels as shown in FIGS. 3 and 4 operates to shred and comminute leaves into mulch without clogging the mulching apparatus.

The universal mulching machine of the present invention reduces the volume of leaves to a volume of about fifteen percent (15%) to twenty per cent (20%) of initial volume. Six (6) dump truck loads of leaves and brush are reduced to one (1) dump truck load of valuable, reusable mulch. This substantial reduction in volume significantly reduces costs associated with collecting leaves and disposing of such.

The machine of the present invention not only collects voluminous amounts of leaves and landscaping vegetation refuse matter from large lots and golf courses and the like, but the machine also collects and reduces such leaves and vegetation matter in large volumes without clogging.

The machine of the present invention has been found to provide the advantage of clogging prevention even when processing large volumes of vegetation matter having a propensity for clogging, such as wet leaves.

Since the flingers of the present invention are designed and constructed as bar members of substantive mass, the flingers as such can be sharpened for increased shredding power and can be made to be adapted to other materials desired to be shredded including, by way of example, recycling beverage cans.

The universal mulching machine of the present invention will process limbs or brush having diameters of up to and including about one (1) inch through inlet 14.

The universal mulching machine of the present invention through inlet window 133 provides a chipper capable of mulching limbs having diameters up to and including about four (4) inches.

The universal mulching machine of the present invention comminutes leaves, tree limbs, or brush and produces valuable landscaping mulch sized in the range of about the size of common sawdust to about one-half ($\frac{1}{2}$) inch.

The present invention also has been found to extend the useful life of a mower deck. It is believed that stress on the mower deck is reduced by the machine of the present invention which provides high volume pull-through of the leaves and clippings by high volume vacuum applied at the mower deck discharge and reduce load factors on the mower deck blade apparatus.

The universal mulching machine of the present invention in one embodiment comprising a first stage cutter assembly and a second stage flinger assembly further reduces the volume of leaves an additional three-fold volume reduction. Chestnut oak and pin oak were reduced from 110 wagon loads to 21 wagon loads with a universal mulching machine of the present invention comprising a flinger assembly compared to a reduction of 110 wagon loads to only seven (7) loads with a universal mulching machine of the present invention comprising a first stage cutter knives assembly in combination with a second stage flinger assembly. Both machines of the foregoing comparison included a fan assembly in accordance with the apparatus and method of the present invention. This substantial reduction in volume significantly reduces costs associated with collecting leaves and disposing of such, and becomes a significant factor in alleviating environmental land fill concerns.

The universal mulching machine of the present invention in one embodiment comprising a first stage cutter assembly and a second stage flinger assembly has been found to operate to shred and comminute leaves having a tough material consistency and to reduce such tough leaf materials to fine particle sizes. Leaf materials such as oak leaves, and including pin oak and chestnut oak, have a material consistency tougher than leaves such as from trees of maple, cherry, dogwood, poplar, apple, sweet gum, or the like. Nevertheless, the universal mulching machine of the present invention comprising a first stage cutter assembly and a second stage flinger assembly has been found to operate to shred and comminute such oak leaves having tough material consistency and to reduce such tough leaf materials to particle sizes in the range of dust to about one-eighth ($\frac{1}{8}$) inch.

Anyone operating a machine as disclosed in this specification must be alert to use safety equipment such as goggles or eye protection to prevent injuries from flying matter.

Further advantages of the universal mulching machine of the present invention include the capability of traveling up and down hills and over rough terrain while collecting and processing leaves and other landscaping materials.

The apparatus and method of the present invention can include a framed housing provided with wheels as illustrated in the form of a wheeled frame housing, but the machine and method can be operated alternatively without wheels as in one aspect with a three-point hitch providing the necessary support.

The apparatus and method of the present invention are not limited to the descriptions of specific embodiments hereinabove, but rather the apparatus and method of the present invention should be viewed in terms of the claims that follow and equivalents thereof.

What is claimed is:

1. A mulching apparatus for commununting solid material in combination with a mower deck comprising:
   a. a mower deck;
   b. a housing having an inlet at the top periphery of said housing and an outlet;
   c. a fluid propulsion chamber comprising means for propelling solid material between said inlet and outlet;
   d. a first stage cutter assembly chamber comprising a pair of counter-rotating cutter knife assemblies in combination with a comminuting chamber comprising at least sixteen flexible flinger and flinger drive means disposed within said housing and adapted to contact and comminute solid material traversing from said inlet to said outlet, each flinger comprising a substantially rigid flinger bar member movably attached pivotally over at least 150 degrees of rotation to said drive means;
   e. means for inhibiting clogging of said solid material comprising a first passageway from said first stage cuter assembly chamber to said comminuting chamber and a second passageway from said comminuting chamber to said fluid propulsion chamber, each said passageway having a minimum dimension of about four inches; and f. means for connecting a suction hose to a discharge from said mower deck through at least one conduit fitting having a configuration forming an angle between said discharge and said inlet of less than about sixty degrees.

2. Apparatus as set forth in claim 1 further comprising protective channels within said comminuting chamber, said protective channels positioned along the path of flinger movement for reducing clogging of said flinger.

3. Apparatus as set forth in claim 1 wherein said rigid flinger bar member has an intertial mass of at least the mass provided by a one-quarter inch thick steel bar of at least one inch width and at least three inches length pivotally attached to its drive member.

4. Apparatus as set forth in claim 1 wherein said means for propelling solid material and said flinger drive means are driven by a single rotating shaft, and wherein power is transmitted to said rotating shaft through a centrifugal clutch.

5. Apparatus as set forth in claim 4 comprising an engine or motor for providing power transmitted through said centrifugal clutch.

6. Apparatus as set forth in claim 5 comprising a power take-off receiving power transmitted through said centrifugal clutch.

7. Apparatus as set forth in claim 1 wherein said means for propelling solid material comprises a fan blade extending from said rotating shaft to a diameter of about twelve inches.

8. Apparatus as set forth in claim 7 wherein said means for propelling solid material further comprises a fan blade stabilizer connecting at least two fan blades.

9. Apparatus as set forth in claim 8 wherein said means for propelling solid material further comprises a shroud radially positioned near the fan blades with a radius of curvature slightly larger than a radius extending out to the fan blade periphery.

10. Apparatus as set forth in claim 9 wherein said fan blade stabilizer comprises a raised cutting edge, said cutting edge positioned on a bias to said fan blade stabilizer and adjacent a closeable side shield positioned as a side window in said housing.

11. Apparatus as set forth in claim 1 further comprising a second flinger chamber comprising a plurality of flingers and flinger drive means in combination with said comminuting chamber.

12. Apparatus as set forth in claim 1 comprising a wheeled frame and hitch receiver supporting said housing.

13. Apparatus as set forth in claim 1 wherein said housing inlet at or near the periphery of said housing comprises an inlet into the top of said mulching apparatus.

14. A method of mulching solid material received from the discharge of a mower deck comprising:
a. receiving solid material from the discharge from a mower deck;
b. passing said solid material through a housing from an inlet at the top periphery of said hosing to an outlet through passageways in said housing having a minimum dimension of about four inches;
c. comminuting said solid material in said housing by contacting said solid material with a plurality of counter-rotating knives in a first stage cutter assembly in combination with a flinger assembly having at least one rigid bar in a flexible pivot attachment rotatable over a pivot rotation angle of at least about 150 degrees to a drive means; and
d. connecting a suction hose to said discharge from said mower deck through at least one conduit fitting having a configuration forming an angle between said discharge and said inlet of less than about sixty degrees.

15. A method as set forth in claim 14 further comprising passing said rigid bar between protective channel bars or channel rods defining a protective channel substantially parallel to the path of said bar movement, whereby said protective channel permits said rigid bar to stand up and pass through said channel and further whereby said protective channel permits said rigid bar member to stand down over said pivot rotation of at least 150 degrees thereby to reduce contact with solid material and inhibit clogging, said member having an inertial mass of at least the mass provided by a one-quarter inch thick steel bar of at least one inch width and at least three inches length pivotally attached to its drive member.

16. A member as set forth in claim 14 further comprising passing said solid material through a first stage cutter assembly and a plurality of said flinger bar members as a second stage flinger assembly.

17. A mulching apparatus for comminuting solid landscaping material in combination with a mower deck comprising:
a. a mower deck supported on a drive vehicle;
b. a wheeled frame with hitch receiver for attachment to said drive vehicle;
c. a housing on said frame, said housing having an inlet opening at the top of the periphery of said housing and an inlet opening;
d. a power-driven, rotatable shaft mounted in said housing;
e. a fan chamber containing a fan blade assembly driven by said shaft for propelling said solid material between said inlet opening and said outlet opening, wherein said fan blade extends from said rotatable shaft;
f. a first sage cutter chamber containing a pair of counter-rotating cutter knife assemblies in combination with a comminuting chamber containing a flinger assembly comprising a plurality of flexible flinger bars rotatably driven by said shaft, each flinger bar comprising a substantially rigid bar member movably affixed pivotally on said flinger assembly over a range of rotation of flinger bars on said flinger assembly of 360 degrees and having an inertial mass of at least the mass provided by a one-quarter inch thick steel bar of at least one inch width and at least three inches length pivotally attached to its drive member;
g. means for inhibiting clogging of said solid material comprising a first passageway between said first stage cutter chamber and said comminuting chamber and a second passageway between said comminuting chamber and said fan chamber, each said passageway having a minimum dimension of about four inches; and
h. means for connecting a suction hose to a discharge from said mower deck through at least one conduit fitting having a configuration forming an angle between said discharge and said inlet of less than about sixty degrees.

18. Apparatus as set forth in claim 17 wherein said means for inhibiting clogging further comprises protective channel means for providing for flinger movement through said channel means whereby said movably affixed flinger bar member is disposed to stand out radially from said rotatably driven flinger assembly while flexibly traversing through said channel formed by channel rods or channel bars extending substantially parallel to flinger bar movement such that said moveably affixed flinger bars stand down in lateral bar extension movement upon contacting solid material sufficient in mass to produce clogging in said housing.

19. Apparatus as set forth in claim 17 further comprising a first stage cutter assembly and wherein said flinger assembly comprises a second stage assembly for comminuting landscaping materials having a tough material consistency to fine particle sizes.

* * * * *